United States Patent [19]

Ebihara et al.

[11] 4,163,258

[45] Jul. 31, 1979

[54] NOISE REDUCTION SYSTEM

[75] Inventors: Norio Ebihara; Kaichi Tatsuzawa, both of Yokohama, Japan

[73] Assignee: Sony Corporation, Tokyo, Japan

[21] Appl. No.: 753,081

[22] Filed: Dec. 21, 1976

[30] Foreign Application Priority Data

Dec. 26, 1975 [JP] Japan ................. 50-157206

[51] Int. Cl.² ............ H04N 5/21; H04N 7/04; H04B 1/10; G01T 1/16
[52] U.S. Cl. ................. 358/167; 358/141; 325/65; 364/515
[58] Field of Search .......... 358/12, 13, 133, 141, 358/167, 36; 325/42, 65, 473, 474; 179/15 BC; 364/515, 724–726, 825–827

[56] References Cited

U.S. PATENT DOCUMENTS

| | | | |
|---|---|---|---|
| 3,204,034 | 8/1965 | Ballard et al. | 179/15 BC |
| 3,333,055 | 7/1967 | Krause | 358/167 |
| 3,605,019 | 9/1971 | Cutter et al. | 325/65 |
| 3,679,821 | 7/1972 | Schroeder | 358/136 |
| 3,715,477 | 2/1973 | Olson et al. | 358/36 |
| 3,792,355 | 2/1974 | Miyata et al. | 179/15 BC X |
| 3,810,019 | 5/1974 | Miller | 325/65 X |
| 3,984,626 | 10/1976 | Mounts et al. | 179/15 BC X |
| 4,001,564 | 1/1977 | Bied-Charreton et al. | 179/15 BC X |
| 4,009,334 | 2/1977 | Sypula | 358/167 |
| 4,038,539 | 7/1977 | Van Cleave | 367/724 |
| 4,054,909 | 10/1977 | Kojima et al. | 358/13 |

OTHER PUBLICATIONS

Applications of Walsh Functions and Sequency Theory: Mitre Corporation ©1974:IEEE Cat. No. 74CH0861-5EMC.

*Primary Examiner*—Robert L. Griffin
*Assistant Examiner*—Aristotelis M. Psitos
*Attorney, Agent, or Firm*—Lewis H. Eslinger; Alvin Sinderbrand

[57] ABSTRACT

A method of and apparatus for reducing the noise of an input signal, such as a composite video signal. An orthogonal transform of the input signal is derived, this orthogonal transform having n transformed signal components. At least some of these signal components are suppressed if their respective signal levels are less than a threshold level. Preferably, the n transformed signal components correspond to different portions of the input signal; and those components representing the higher frequency portions are suppressed if their signal levels are less than the threshold level. Following this signal suppression, the n transformed signal components are reconverted into substantially the input signal, less the suppressed components.

24 Claims, 11 Drawing Figures

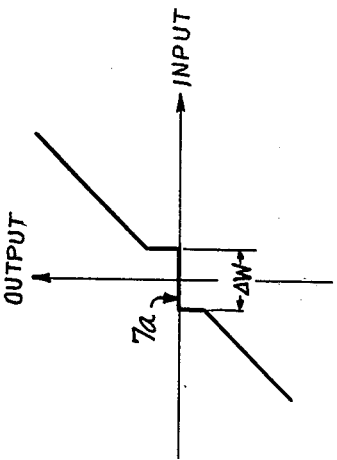
FIG. 6
FIG. 2
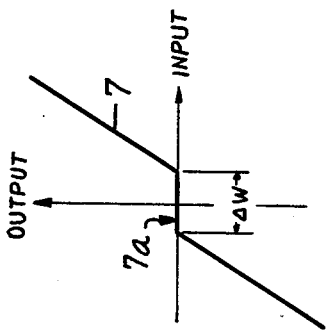
FIG. 1
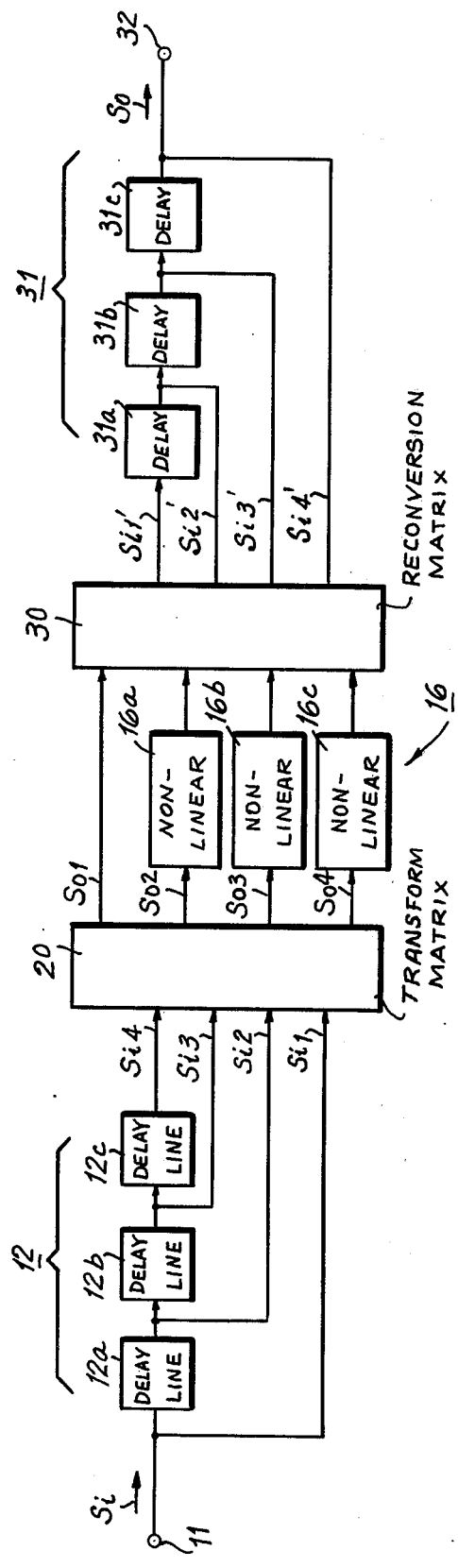
FIG. 3

NOISE REDUCTION SYSTEM

BACKGROUND OF THE INVENTION

This invention relates to a noise reduction system and, more particularly, to such a system which is useful in reducing the noise in the higher frequency portions of a signal such as a composite video signal, without imparting significant distortion into the noise-reduced version of the input signal.

The power distribution characteristic of the frequency spectrum in a composite video signal is such that the lower frequency components generally exhibit higher signal levels than the higher frequency components. Consequently, the signal-to-noise (S/N) ratio is much higher for the lower frequency components than for the higher frequency components of such a signal. This means that if noise is uniformly distributed over the frequency spectrum, such noise usually will not deleteriously influence the lower frequency components of the video signal because of the higher S/N ratio. However, since the S/N ratio is not as good in the higher frequency portion of the video signal spectrum, it is desirable to suppress such noise.

In one noise reduction proposal, the low frequency and high frequency components of the video signal are separated from each other, typically by low-pass and high-pass filters. Then, the noise which accompanies the high frequency components, such as noise produced by a video tape recorder (VTR) used to record and play back video signals, is suppressed. Such noise suppression is carried out on the basis of the relatively poor S/N ratio exhibited by the higher frequency portion of the video signal. That is, it is assumed that if the signal level of the higher frequency components is less than a threshold level, then, because of this poor S/N ratio, such low-level signals are noise. Accordingly, the higher frequency signal level that does not exceed the threshold level is suppressed. Following this signal suppression stage, the separated lower frequency and higher frequency components are recombined so as to reconstruct essentially the input video signal.

Unfortunately, if filters are relied upon for separating the higher and lower frequency components of the input video signal, the fact that such filters generally impart unequal phase shifts to the signals applied thereto results in phase distortion when the low frequency components are recombined with the high frequency components. Also, the amplitude-frequency characteristics of these filters generally are not equal. Hence, because of the different phase-shifts and the different amplitude characteristics in the recombined lower frequency and higher frequency components attributed to these filters, the resultant video signal exhibits significant distortion which is detectable in the reproduced video signal.

OBJECTS OF THE INVENTION

Therefore, it is an object of the present invention to provide an improved method of and apparatus for suppressing noise components in an input signal that avoids the foregoing defects and disadvantages.

Another object of this invention is to provide an improved method of and apparatus for reducing noise in a composite video signal.

A further object of this invention is to provide an improved noise reduction system which avoids the use of filter circuits.

An additional object of this invention is to provide a method of and apparatus for suppressing noise in an input signal by deriving the orthogonal transform of that signal and suppressing the noise in selected transformed signal components.

Yet another object of this invention is to provide a method of and apparatus for suppressing the noise which accompanies a composite signal by dividing that signal into different frequency bands and then suppressing the noise in selected ones of such bands.

A still further object of this invention is to provide a method of and apparatus for suppressing the noise of an input signal by deriving the Hadamard transform of that signal and by attenuating selected components produced by the Hadamard transform.

Various other objects, advantages and features will become readily apparent from the ensuing detailed description, and the novel features will be particularly pointed out in the appended claims.

SUMMARY OF THE INVENTION

In accordance with the present invention, a method of and apparatus for reducing the noise of an input signal, such as a composite video signal, are provided. An orthogonal transform of the input signal is derived, this orthogonal transform having n transformed signal components. At least some of these signal components are suppressed if their respective signal levels are less than a threshold level. The n transformed signal components, following this signal suppression, are reconverted substantially into the original input signal, less the suppressed components.

BRIEF DESCRIPTION OF THE DRAWINGS

The following detailed description, given by way of example, will best be understood in conjunction with the accompanying drawings in which:

FIG. 1 is a block diagram of one proposal of a noise reduction system;

FIG. 2 is a graphical representation showing the characteristics of a circuit that can be used in a noise reduction system;

FIG. 3 is a block diagram of one embodiment of the present invention;

FIG. 6 is a graphical representation of the characteristics of a circuit that can be used in the embodiment shown in FIG. 3;

DETAILED DESCRIPTION OF SOME OF THE PREFERRED EMBODIMENTS

In the interest of simplification, it is assumed that, for the purpose of this description, the input signal, designated $S_i$, is a composite video signal, such as a color television signal, or the like. However, it should be understood that the input signal can represent other information or data. It also is assumed that, in such an input signal, both higher and lower frequency components are present; and that the signal-to-noise (S/N) ratio is greater for the lower frequencies than for the higher frequencies. Thus, if the input signal is a video signal, its signal distribution throughout the associated frequency spectrum is as illustrated in FIG. 8 which represents that most of the signal information is disposed in the lower frequency portion of the illustrated distribution.

Figure 8:
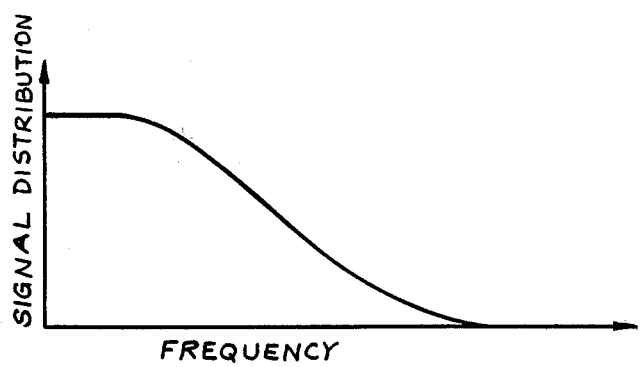
FIG. 8 is a graphical representation of the frequency-related power spectrum of the video signal.

Turning now to FIG. 1, there is illustrated one embodiment of a proposed noise reduction system which can be used with an input signal $S_i$ whose signal distribution is of the type shown in FIG. 8. This input signal is applied to input terminal 1 and is separated by low-pass filter 2 into its lower frequency components and by a high-pass filter 3 into its higher frequency components; these filters being connected in common to the input terminal. As mentioned above, because of the higher S/N ratio at the lower frequencies, it is assumed that the lower frequency signals passed by low-pass filter 2 are substantially free of deleterious noise. However, the lower S/N ratio at the higher frequencies results in significant noise present at the output of high-pass filter 3. Stated otherwise, if noise, which may be produced in a VTR system during signal recording or signal playback, is uniformly distributed, the presence of such noise is more apparent at the higher frequencies and is relatively negligible at the lower frequencies. Accordingly, to suppress these noise components of the higher frequencies, the signal components passed by high-pass filter 3 are suppressed in a nonlinear circuit 4 if such signal components have an amplitude level that is less than a threshold level established for the nonlinear circuit. That is, it is assumed that if the higher frequency components passed by high-pass filter 3 do not exceed this threshold level, then such components are noise and should be suppressed.

The voltage transfer characteristic of nonlinear circuit 4 is as depicted by curve 7 shown in FIG. 2. This transfer characteristic exhibits a "dead-band" or non-responsive portion 7a wherein no output voltage is produced until the input voltage exceeds the threshold level. This non-responsive portion is symmetrical for positive and negative signals such that input voltages within a range $\Delta W$ produce no output voltage. Of course, once the input voltage exceeds this threshold level, the output voltage produced by nonlinear circuit 4 is directly proportional thereto. As one example, nonlinear circuit 4 may be comprised of back-to-back diodes connected to a bias resistor.

The output voltage produced by nonlinear circuit 4, which is directly proportional to the input voltage, provided that the input voltage exceeds the threshold level, is combined in an adding circuit 5 with the lower frequency components passed by low-pass filter 2. In this manner, an output signal $S_o$, which should be substantially the same as input signal $S_i$, less the noise components which have been suppressed in nonlinear circuit 4, is supplied to an output terminal 6. However, it is expected that the phase-shift imparted by low-pass filter 2 to the lower frequency components in input signal $S_i$ is not equal to the phase-shift imparted by high-pass filter 3 to the higher frequency components. Consequently, phase distortion is provided in output signal $S_o$ because of these unequal phase shifts. Also, because of dissimilar amplitude characteristics of the high-pass and low-pass filters, amplitude distortion is introduced into output signal $S_o$. These phase and amplitude distortions in the output signal are discernible in the reproduced video signal.

These defects are avoided in accordance with the noise reduction system illustrated in FIG. 3. With this apparatus, an orthogonal transform of the input signal $S_i$ is derived and selected components of the transformed signal are suppressed. Then, the transformed components are reconverted into substantially the input signal.

In deriving the orthogonal transform of input signal $S_i$, it is assumed that this signal can be expressed as $\overline{X}=(x_1, x_2, \ldots x_n)$ and that the orthogonal transform of $\overline{X}$ can be expressed as $\overline{Y}=(y_1, y_2, \ldots y_n)$. Now, to obtain $\overline{Y}$, $\overline{X}$ is multiplied by the orthogonal transform of matrix A. Similarly, to reconvert the transformed signal, then $\overline{X}$ can be obtained by multiplying $\overline{Y}$ by the matrix B. These functions can be expressed as:

$$\overline{Y} = A\overline{X}$$
$$\overline{X} = B\overline{Y} \tag{1}$$

wherein $B = A_{-1}$, that is, B is the inverted matrix A.

Now, the mathematical expression for matrix A is:

$$A = \begin{bmatrix} a_{11} & a_{12} \cdots a_{1n} \\ a_{21} & a_{22} \cdots a_{2n} \\ \vdots & \\ a_{n1} & a_{n2} \cdots a_{nn} \end{bmatrix} \tag{2}$$

and, similarly, matrix B can be mathematically expressed as:

$$B = \begin{bmatrix} b_{11} & b_{12} \cdots b_{1n} \\ b_{21} & b_{22} & b_{2n} \\ \vdots & & \vdots \\ b_{n1} & b_{n2} & b_{nn} \end{bmatrix} \tag{3}$$

Now, from equations (1), (2), and (3), the transformed signal $\overline{Y}$ can be expressed as:

$$\begin{aligned} y_1 &= a_{11}x_1 + a_{12}x_2 + \ldots + a_{1n}x_n \\ y_2 &= a_{21}x_1 + a_{22}x_2 + \ldots + a_{2n}x_n \\ &\vdots \\ y_n &= a_{n1}x_1 + a_{n2}x_2 + \ldots + a_{nn}x_n \end{aligned} \tag{4}$$

and the reconverted signal $\overline{X}$ can be expressed as:

$$\begin{aligned} x_1 &= b_{11}y_1 + b_{12}y_2 + \ldots + b_{1n}y_n \\ x_2 &= b_{21}y_1 + b_{22}y_2 + \ldots + b_{2n}y_n \\ &\vdots \end{aligned} \tag{5}$$

-continued
$$x_n = b_{n1}y_1 + b_{n2}y_2 + \ldots + b_{nn}y_n$$

From equations (4) and (5), it is seen that the relationship between the input signal mathematically expressed as $\overline{X}$ and the orthogonal transformed output signal mathematically expressed as $\overline{Y}$ is linear.

The orthogonal transform matrix is an n×n matrix wherein the conversion and reconversion matrices both are n×n. Typical orthogonal transform matrices which can be used are the Fourier transform matrix or the Hadamard transform matrix. Other orthogonal matrices also can be used; but the Hadamard transform matrix is preferred. When the Hadamard transform matrix of a composite video signal is derived, the resultant n transformed signal components represent different respective portions of the frequency spectrum of the original video signal. That is, if the video signal is represented as $\overline{X}$, and the n transformed signal components derived by the Hadamard matrix are $y_1, y_2, \ldots y_n$, as represented in equation (4), then the component $y_1$ contains the lowest frequency components of the video signal, $y_2$ contains the next lowest frequency components of the video signal, $\ldots y_{n-1}$ contains the next higher frequency components of the video signal, and $y_n$ contains the highest frequency components of the video signal.

An Hadamard transform matrix formed of four rows and four columns can be expressed as:

$$H_4 = \frac{1}{4} \begin{bmatrix} 1 & 1 & -1 & 1 \\ 1 & 1 & -1 & -1 \\ 1 & -1 & -1 & 1 \\ 1 & -1 & 1 & -1 \end{bmatrix} \quad (6)$$

wherein the fraction $\frac{1}{4}$ is provided for unity gain. In row 1 of this matrix, it is seen that the multipliers are not subjected to any polarity change. Hence, row 1, which corresponds to transformed component $y_1$, contains the DC and lowest frequency components. The multipliers of row 2 of the Hadamard matrix exhibit one change in polarity. This row corresponds to transformed component $y_2$ and includes the next higher frequency components. The multipliers of row 3 of the Hadamard matrix exhibit two polarity changes. Hence, this row corresponds to transformed component $y_3$ and contains the next higher frequency components. Finally, the multipliers of row 4 of this Hadamard matrix exhibit three polarity changes. This row corresponds to tranformed component $y_4$ and contains the highest frequency components. Thus, the Hadamard transform of a composite video signal divides this video signal into individual components, each component corresponding to a different portion of the frequency spectrum of the video signal. An advantage of using the Hadamard transform is that the very same matrix which is used for deriving the transformed components of the input video signal can be used for reconverting such transformed components back into the original video signal.

Turning now more specifically to the embodiment shown in FIG. 3, the noise reduction system is comprised of a sampling circuit 12, an orthogonal transform matrix 20, signal suppressing circuit 16, an orthogonal reconversion matrix 30, and combining circuit 31. Sampling circuit 12 is coupled to an input terminal 11 and is supplied with input signal $S_i$. This sampling circuit is adapted to sample the input signal at successive time intervals and, in the illustrated embodiment, four such time-samples of the input signal are obtained as $S_{i4}, S_{i3}$, $S_{i2}$ and $S_{i1}$. Sampling circuit 12 may be comprised of a conventional sampling circuit, such as a sample and hold circuit, but is illustrated as cascaded delay lines 12a, 12b and 12c. By using these delay lines, time-samples $S_{i1}, \ldots S_{i4}$ are produced concurrently during any sampled time interval. As one example, if the frequency band of a video signal constituting input signal $S_i$ is 4.5 MHz, then as is known, a suitable sampling rate is 10 MHz. Successive time-samples thus are produced every 100 n sec. Therefore, each delay line exhibits a 100 n sec. delay. As a consequence thereof, time-sample $S_{i4}$ is subjected to a 300 n sec. delay, time-sample $S_{i3}$ is subjected to a 200 n sec. delay, time-sample $S_{i2}$ is subjected to a 100 n sec. delay, and time-sample $S_{i1}$ is subjected to no delay. Although only four time-samples are described for the illustrated embodiment, it is appreciated that n successive time-samples can be used, and sampling circuit 12 may be formed of (n−1) delay lines for the purpose of imparting different delays to the n successive time-samples so that all of these time-samples are produced concurrently at the output of the sampling circuit. In another embodiment, parallel-connected sample and hold circuits are supplied in common with input signal $S_i$ so as to produce these n (or four in the illustrated embodiment) time-samples concurrently.

Figure 4:
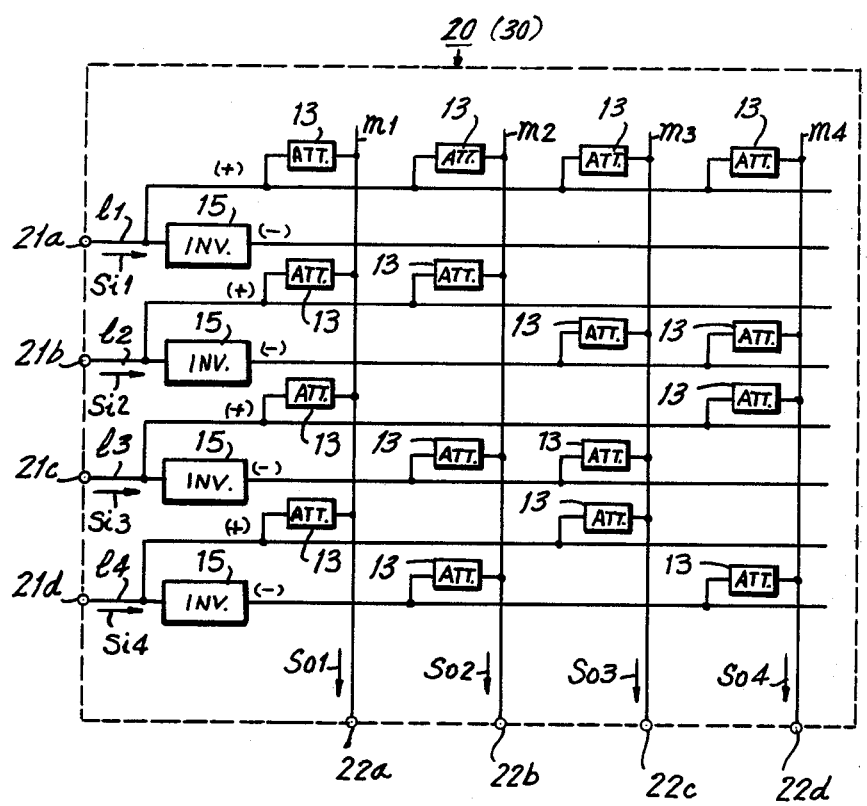
FIG. 4 is a circuit diagram of one of the elements shown in FIG. 3.

Orthogonal transform matrix 20 is provided with n input terminals adapted to receive concurrently the n time-samples produced by sampling circuit 12. In the illustrated embodiment, four such samples are produced, and orthogonal transform matrix 20 is a 4×4 matrix comprised of four rows of multipliers, each row formed of four columns. In the embodiment being described, orthogonal transform matrix 20 is an Hadamard matrix adapted to perform the Hadamard transform represented mathematically by equation (6). One embodiment of a physical realization of this Hadamard transform is illustrated in FIG. 4. In this illustrated embodiment, matrix 20 is comprised of four rows $1_1, 1_2, 1_3$ and $1_4$, each row including four columns of attenuator circuits 13. An input terminal 21a, 21b, 21c and 21d is provided for each row. A respective phase inverter 15 is coupled to a corresponding input terminal and, in selected rows, the inputs of selected ones of attenuator circuits 13 therein are coupled to the output of phase inverter 15. The remaining attenuator circuits in such rows have their inputs coupled to the associated input terminal. In row $1_1$, the inputs of all of attenuator circuits 13 are connected in common to input terminal 21a. Hence, phase inverter 15 in row $1_1$ can be omitted. Each attenuator circuit 13 is adapted to attenuate the signal applied thereto by a factor of $\frac{1}{4}$; and each phase inverter 15 is adapted to invert the phase, or polarity, of the signal applied thereto.

The outputs of attenuator circuits 13 in each column are connected in common to an associated output terminal. Thus, the outputs of attenuator circuits 13 in column $m_1$ are connected in adding relation to output terminal 22a; the outputs of attenuator circuits 13 in column $m_2$ are connected in adding relation to output terminal 22b; the outputs of attenuator circuits 13 in column $m_3$ are connected in adding relation to output terminal 22c; and the outputs of attenuator circuits 13 in column $m_4$ are connected in common to output terminal 22d. Thus, the outputs of the respective attenuator circuits in each column are added and applied to the associated output terminal.

If it is assumed that time-sample $S_{i1}$ is applied to input terminal 21a, this time-sample is multiplied by a set of attenuation factors established by the attenuator circuits associated with row $1_1$. Similarly, if time-sample $S_{i2}$ is applied to input terminal 21b, this time-sample is multiplied by an attenuation factor established by the attenuator circuit in columns $m_1$ and $m_2$ of row $1_2$, and the inverted version of time-sample $S_{i2}$ is multiplied by the attenuation factor established by attenuator circuits 13 in columns $m_3$ and $m_4$ of row $1_2$. Similar multiplications of time-samples $S_{i3}$ and $S_{i4}$ are attained in rows $1_3$ and $1_4$, respectively, in accordance with the selected connections of the illustrated attenuator circuits disposed in such rows. The output signals $S_{o1}$, $S_{o2}$, $S_{o3}$ and $S_{o4}$ produced at output terminals 22a, 22b, 22c and 22d, respectively by the illustrated matrix circuit can be expressed as:

$$S_{o1} = \frac{1}{4} (S_{i1} + S_{i2} + S_{i3} + S_{i4}) \quad (7)$$

$$S_{o2} = \frac{1}{4} (S_{i1} + S_{i2} - S_{i3} - S_{i4})$$

$$S_{o3} = \frac{1}{4} (S_{i1} - S_{i2} - S_{i3} + S_{i4})$$

$$S_{o4} = \frac{1}{4} (S_{i1} - S_{i2} - S_{i3} - S_{i4})$$

As discussed above, output signal $S_{o1}$ contains the DC and lower frequency components; output signal $S_{o2}$ contains the next higher frequency components; output signal $S_{o3}$ contains the next higher frequency components; and output signal $S_{o4}$ contains the highest frequency components of the input signal $S_i$.

The signal distribution of the frequency spectrum of a video signal is graphically shown in FIG. 8 and has been discussed above. A substantial portion of a television picture is comprised of background. The luminance level of this background generally varies relatively slowly. Hence, a significant portion of the signal distribution of a video signal includes the lower frequency components corresponding to such background. The boundary between the background and an object in a television picture corresponds to the higher frequency components of the video signal. That is, luminance level changes between light and dark objects are more abrupt and, therefore, are represented as higher frequency video signal components. Output signals $S_{o1}$ and $S_{o2}$ produced by transform matrix 20 contain the aforementioned lower frequency components, and output signals $S_{o3}$ and $S_{o4}$ contain the higher frequency components. As seen in the signal distribution curve of FIG. 8, most of the video signal information is included in the lower frequency components of output signals $S_{o1}$ and $S_{o2}$; whereas a much smaller portion of the video signal is contained in the higher frequency components of output signals $S_{o3}$ and $S_{o4}$. However, if the video signal is accompanied by random noise which is distributed uniformly throughout the frequency band, such noise also is distributed uniformly in output signals $S_{o1} \ldots S_{o4}$. Since the S/N ratio in the lower frequency components, that is, in output signals $S_{o1}$ $S_{o2}$, is relatively high, the problem of accompanying noise in these components is not as pronounced. But since the S/N ratio in the higher frequency components, that is in output signals $S_{o3}$ and $S_{o4}$, is relatively low, it can be assumed that if the signal level of these output signals is less than some predetermined threshold, then such signal is, in fact, noise. stated otherwise, because of this low S/N ratio, it is assumed that an output signal that is less than the threshold level is noise, and an output signal that exceeds this threshold level is a higher frequency component of the video signal. Even if a higher frequency component of the video signal is suppressed because it is erroneously assumed that such component has a low signal level and, therefore, is noise, this signal suppression will have negligible influence on the perceived television picture because the higher frequency components of the video signal have only little effect on an individual's visual perception characteristic. Thus, even if signal suppression circuits 16 result in the reproduction of a television picture having less than precise fidelity in the higher frequency portion thereof, this generally will not be perceived by the human eye.

Signal suppression circuit 16 is comprised of nonlinear circuits 16a, 16b and 16c, which are supplied with output signals $S_{o2}$, $S_{o3}$ and $S_{o4}$, respectively. It is appreciated that if transform matrix 20 produces a larger number of output signals, a corresponding larger number of nonlinear circuits will be provided. Each nonlinear circuit may exhibit a transfer characteristic of the type shown in FIG. 2 and, therefore, may be similar to aforedescribed nonlinear circuit 4. Thus, if the signal level of any of output signals $S_{o2}, \ldots S_{o4}$ is within the range $\Delta W$ (FIG. 2), this signal level will be suppressed. If the signal level of the output signal applied to a nonlinear circuit exceeds the threshold level associated with that nonlinear circuit, then the output signal of such nonlinear circuit will be directly proportional to the corresponding output signal applied thereto by transform matrix 20.

As shown in FIG. 3, output signals $S_{o2}$, $S_{o3}$ and $S_{o4}$ are supplied through nonlinear circuits 16a, 16b and 16c, respectively, to reconversion matrix 30; whereas output signal $S_{o1}$ is supplied directly to the reconversion matrix. This is because output signal $S_{o1}$ contains the DC and lowest frequency components of input signal $S_i$. Since a substantial portion of the video signal information is represented by output signal $S_{o1}$, it is preferred to avoid introducing any distortion which may be caused by the action of a nonlinear circuit on output signal $S_{o1}$, thus avoiding observable distortion in the reconverted video signal and subsequently reproduced television picture.

Figure 5:
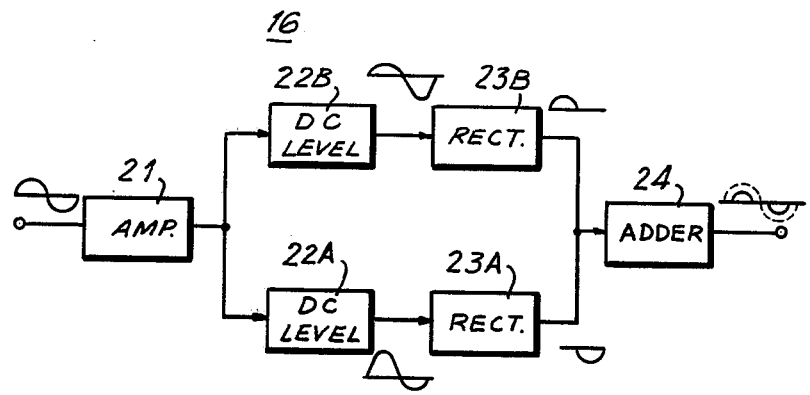
FIG. 5 is a block diagram of one embodiment of another element of a circuit shown in FIG. 3.

Although nonlinear circuits 16a, 16b and 16c each may be of a type similar to aforedescribed nonlinear circuit 4, one embodiment of the nonlinear circuits shown in FIG. 3 is illustrated in FIG. 5. As shown, this nonlinear circuit is comprised of a buffer amplifier 21 adapted to receive a transformed signal component, that is, one of output signals $S_{o2}$, $S_{o3}$ or $S_{o4}$, a pair of parallel signal paths each comprised of a bias circuit connected in cascade with a rectifier, and a summing circuit 24 for summing the outputs of the parallel signal paths. In one signal path, a DC bias circuit 22B is adapted to increase the positive bias level of the transformed signal component supplied through buffer amplifier 21, and a rectifier 23B is adapted to rectify the positive portions of the transformed signal component which exceed the positive bias level established by bias circuit 22B. Similarly, in the other signal path, bias circuit 22A is adapted to increase the negative bias level of the transformed signal component which is applied thereto by buffer amplifier 21, and rectifier 23A is adapted to rectify the negative portions of the transformed signal component which exceed the negative bias level. Thus, bias circuit 22B establishes a positive threshold level and bias circuit 22A establishes a negative threshold level. The respective rectifiers 23B and 23A apply to summing circuit 24 only those positive and negative portions, respectively, of the transformed signal component which exceed these positive and negative threshold levels. Typical waveforms of the signals transmitted in the parallel signal paths are shown in FIG. 5; and the resultant waveform produced by summing circuit 24 is shown by the solid line representation at the output of this circuit. The broken line waveform represents the output of this nonlinear circuit in the event that bias circuits 22A and 22B are omitted. Thus, it is seen that this illustrated nonlinear circuit is not responsive to certain signal level ranges, thus providing the "deadband" $\Delta W$ shown in FIG. 2.

Although the transfer characteristic of the nonlinear circuit shown in FIG. 5 represents that the output signal is directly proportional to the input signal, it is seen that, because of the non-responsive range $\Delta W$, the output signal is not equal to the input signal. This is because the output signal level is zero when the input signal level is slightly greater than the threshold level. In an alternative nonlinear circuit, the transfer characteristic is as shown in FIG. 6 wherein the output signal level is equal to the input signal level once the input signal exceeds the threshold level. Thus, even though this nonlinear circuit has a non-responsive range $\Delta W$, shown as 7a, nevertheless, once the input signal level is slightly greater than the threshold level, as shown at 7, the output signal level is equal to this input signal level. With this transfer characteristic, amplitude distortion due to the presence of the nonlinear circuit is reduced.

Figure 7:
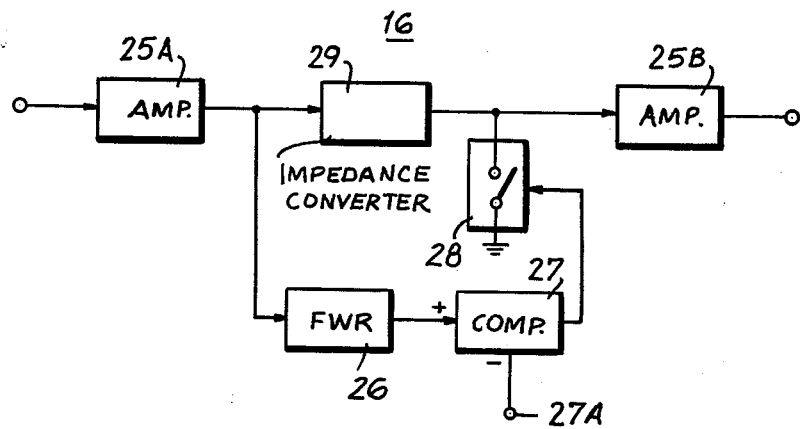
FIG. 7 is a block diagram of another embodiment of a circuit that is shown in FIG. 3.

One embodiment of a nonlinear circuit having the transfer characteristic shown in FIG. 6 is depicted in the block diagram of FIG. 7. This embodiment is comprised of a buffer amplifier 25A, a full-wave rectifier 26, a comparator 27 and an attenuator 28. As shown, buffer amplifier 25A is adapted to receive a transformed signal component, such as output signal $S_{o2}$, $S_{o3}$ or $S_{o4}$ produced by transform matrix 20. The output of amplifier 25A is rectified by full-wave rectifier 26 and is compared in comparator 27 to a reference signal corresponding to a threshold level applied to terminal 27a. Attenuator 28, which may be a switching circuit, a muting device, or the like, is selectively controlled by comparator 27. Attenuator 28 is depicted as a switch connected to selectively by-pass the transformed signal component applied to buffer amplifier 25A and supplied through an impedance converter, or buffer 29. The output of impedance converter 29 is supplied to a further amplifier 25B. If the transformed signal component supplied by amplifier 25A and rectified by full-wave rectifier 26 is less than the threshold level applied to terminal 27a, comparator 27 actuates attenuator 28. This is represented as the closing of the illustrated switch, thus shunting the output of impedance converter 29 to ground level. Hence, the output of amplifier 25B, that is, the output of this nonlinear circuit, is ground, or zero level. However, if the signal level of the transformed signal component exceeds the threshold level applied to terminal 27a, then the signal applied to comparator 27 by full-wave rectifier 26 exceeds the reference level applied to terminal 27a. Comparator 27 thus de-energizes attenuator 28, represented as the opening of the illustrated switch, thereby enabling the signal output of impedance converter to the supplied to and through amplifier 25B. This circuit operation results in the transfer characteristics shown in FIG. 6.

Returning to FIG. 3, it is seen that transformed signal components $S_{o1}, \ldots S_{o4}$, following the signal suppression operation by the nonlinear circuits, are supplied to reconversion matrix 30. This reconversion matrix is adapted to reconvert the transformed signal components into substantially the original signal components $S_{i1}, \ldots S_{i4}$, less the suppressed signals. Accordingly, reconversion matrix 30 is a physical realization of the inverse of the orthogonal transform matrix.

One advantage of using the Hadamard transform matrix for orthogonal matrix 20 is that substantially the same matrix can be used as reconversion matrix 30. Thus, reconversion matrix 30 exhibits the circuit construction illustrated in FIG. 4. When used as the reconversion matrix, input terminals 21a, 21b, 21c and 21d are supplied with transformed signal components $S_{o1}$, $S_{o2}$, $S_{o3}$ and $S_{o4}$, respectively. When such transformed signal components are applied to these input terminals, reconverted signal components $S'_{i1}$, $S'_{i2}$, $S'_{i3}$ and $S'_{i4}$ are produced at output terminals 22a, 22b, 22c and 22d, respectively. It is appreciated that the noise components of these respective reconverted signal components are substantially suppressed by the signal suppression circuit 16.

The reconverted signal components correspond substantially to time-samples $S_{i1}, \ldots S_{i4}$. These reconverted time-samples are combined in circuit 31 so as to reform substantially the original video signal $S_i$. Accordingly, circuit 31 is comprised of cascaded delay lines 31a, 31b and 31c which correspond to delay lines 12a, 12b and 12c, respectively. Hence, delay lines 31a . . . 31c each imparts a delay of 100 n sec. The delays added to the reconverted signal components are inversely related to the delays which had been added to obtain the initial time-samples $S_{i1} \ldots S_{i4}$. Thus, since time-sample $S_{i4}$ had been provided with the greatest delay, reconverted time-sample $S'_{i4}$ is subjected to no delay. Similarly, time-sample $S_{i3}$ had been subjected to a delay of 200 n sec., i.e., two increments of delay attributed to the delay lines, so that reconverted time-sample $S'_{i3}$ is subjected only to a single increment of delay, i.e., a delay of 100 n sec. Also, since time-sample $S_{i2}$ had been subjected to one increment of delay, the reconverted time-sample $S'_{i2}$ now is subjected to two increments of delay. Finally, since time-sample $S_{i1}$ had been subjected to no delay, the reconverted time-sample $S'_{i1}$ now is subjected to three increments of delay, i.e., a delay of 300 n sec. Thus, reconverted time-samples $S'_{i1} \ldots S'_{i4}$ are subjected to different delays by delay lines 31a . . . 31c so that the reconverted time-samples are time displaced to form a sequence of reconverted components corresponding to the sequential time-samples produced by sampling circuit 12. These time sequential reconverted components are combined to reform the composite video signal $S_o$.

In view of the foregoing, the operation of the embodiment illustrated in FIG. 3 should be readily apparent. Accordingly, in the interest of brevity, such operation now will be described only briefly. A composite video signal $S_i$ is applied to input terminal 11 and is sequentially sampled by sampling circuit 12. The resultant time-samples are suitably delayed and supplied as samples $S_{i1} \ldots S_{i4}$ to orthogonal transform matrix 20. This transform matrix divides the applied time-samples of video signal $S_i$ into transformed signal components representing different portions of the frequency spectrum of the video signal. Accordingly, as shown in FIG. 4, transformed component $S_{o1}$ is equal to $\frac{1}{4}(S_{i1}+S_{i2}+S_{i3}+S_{i4})$. Transformed signal component $S_{o2}$ is equal to $\frac{1}{4}(S_{i1}+S_{i2}-S_{i3}-S_{i4})$. Transformed signal component $S_{o3}$ is equal to $\frac{1}{4}(S_{i1}-S_{i2}-S_{i3}+S_{i4})$. Finally, transformed signal component $S_{o4}$ is equal to $\frac{1}{4}(S_{i1}-S_{i2}+S_{i3}-S_{i4})$. In matrix 20 shown in FIG. 4, it is appreciated that the attenuation factor of each of attenuating circuits 13 is equal to $\frac{1}{4}$.

Transformed signal component $S_{o1}$, containing the DC and lower frequency components, is applied directly to reconversion matrix 30. The remaining transformed signal components $S_{o2}$, $S_{o3}$ and $S_{o4}$ are supplied to reconversion matrix 30 via nonlinear circuits 16a, 16b and 16c, respectively. Hence, if the signal level of these transformed signal components $S_{o2} \ldots S_{o4}$ does not exceed the threshold lever associated with the respective nonlinear circuits, the transformed signal component is suppressed. In this manner, noise, which is assumed to be a low-level signal, is suppressed from the higher frequency components of the video signal. Then, following this noise removal operation, the transformed signal components are reconverted in reconversion matrix 30 into substantially the original time-samples $S'_{i1} \ldots S'_{i4}$; and these reconverted time-samples are sequentially delayed by delay circuits 31a, 31b and 31c such that the resultant output signal $S_o$ applied to output terminal 32 essentially is a reformed version of input signal $S_i$, less the suppressed noise components.

In the embodiment of FIG. 3, it is assumed that the orthogonal transform matrix 20 and reconversion matrix 30 are 4×4 Hadamard transform matrices. In alternative embodiments, higher order matrices, such as 8×8, 16×16, or the like, can be used. With such higher order matrices, the frequency spectrum of the input video signal can be divided into a greater number of individual components. Consequently, with such greater resolution, the undesired noise component can be more accurately distinguished from an information signal component and can be properly suppressed. Hence, the quality of the reproduced television picture is increased.

It has been assumed that sampling circuit 12 of FIG. 3 derives successive time samples from a single horizontal line interval of the input video signal. Because of the redundancy of a television picture, the information contained in one horizontal line interval is very similar to the information contained in an adjacent horizontal line interval. That is, one line image does not vary greatly from the next line image. Stated otherwise, the information in one field of a television picture is substantially the same as the information in the next field. Also, one frame of a television picture is quite similar to the next frame. Therefore, the sequential time samples obtained by sampling circuit 12 need not be derived from a single horizontal line. Rather, samples can be derived from adjacent lines, that is, from one line in one field and from the next line in the next field. As a further alternative, the sequential samples can be derived from horizontal lines in successive frames.

Figure 9:
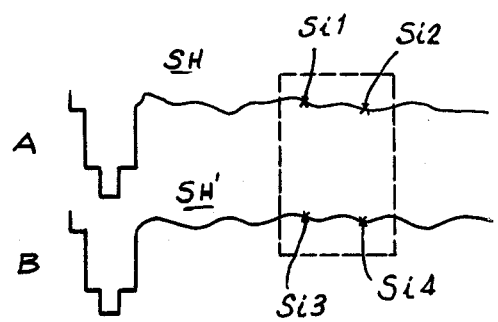
FIG. 9 is a graphical representation that is useful in explaining the operation of another embodiment of the present invention.

As an example of time-samples derived from successive fields, a portion of a horizontal line interval $S_H$ and a portion of the next horizontal line interval $S'_H$ in an adjacent field are graphically depicted in FIG. 9. Enclosed by the broken line are four time-samples: $S_{i1}$ and $S_{i2}$ in line $S_H$; and samples $S_{i3}$ and $S_{i4}$ in line $S'_H$. These samples are taken at the same relative time in each line interval, samples $S_{i1}$ and $S_{i2}$ (as well as $S_{i3}$ and $S_{i4}$) being separated by 100 n sec.

Figure 10:
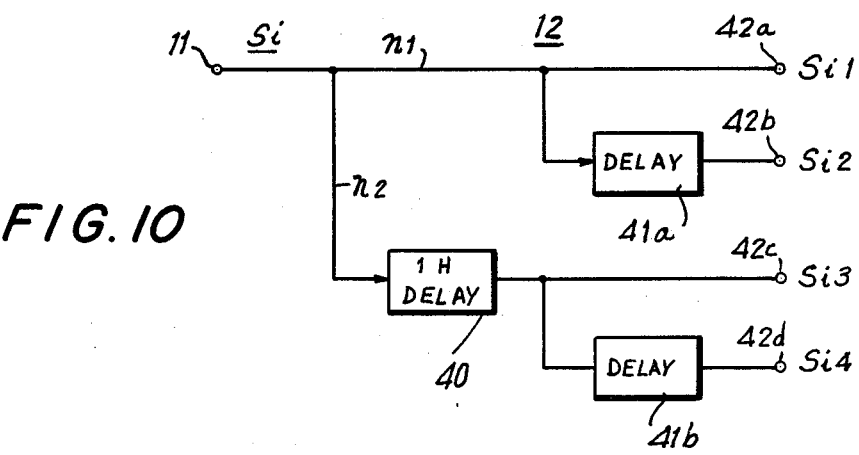
FIG. 10 is a block diagram of a portion of a further embodiment of the present invention which can be used with circuitry of the type shown in FIG. 3.

An embodiment of sampling circuit 12 which can be used to derive samples $S_{i1} \ldots S_{i4}$, as shown in FIG. 9, and apply these samples to orthogonal transform matrix 20 is shown in FIG. 10. In this embodiment of the sampling circuit, a delay line 40 exhibits a delay of one horizontal line interval, and delay lines 41a and 41b each exhibit a delay of, for example, 100 n sec., equal to the delay exhibited by each of delay lines 12a, ... 12c, shown in FIG. 3. In the embodiment of FIG. 10, a first line interval $S_H$ applied to input terminal 11 is supplied via path $n_2$ to delay circuit 40 whereat it is delayed by one horizontal line interval. At the next horizontal line $S'_H$, the previous line of information $S_H$ is produced at the output of delay circuit 40 while this next line $S'_H$ is supplied via path $n_1$. The previous, delayed line $S_H$ is delayed by delay line 41b while the present line $S'_H$ is delayed by delay 41a. Thus, at output terminals 42a, 42b, 42c and 42d, time-samples $S_{i1}$, $S_{i2}$, $S_{i3}$ and $S_{i4}$, respectively, are produced. These time-samples are as shown in FIG. 9 and appear concurrently. That is, at the time that sample $S_{i1}$ is provided at terminal 42a, the previous sample $S_{i2}$ is provided at terminal 42b. Similarly, and at the same time, sample $S_{i3}$ in delayed line $S_H$ is provided at terminal 42c while the previous sample $S_{i4}$ in this delayed line is provided at terminal 42d. These respective time-samples are applied to orthogonal transform matrix 20 to derive the transformed signal components in the manner discussed in detail above. It may be appreciated that, when the embodiment of sampling circuit 12, shown in FIG. 10, is used, a similar delay circuit configuration is coupled to the output of reconversion matrix 30 in order to reform the respective horizontal line intervals $S_H$ and $S'_H$ of the output video signal.

In the foregoing embodiments, it has been assumed that the input signal is an analog composite video signal. Orthogonal transform matrix 20 (and reconversion matrix 30) are operable upon the time-samples of such an analog signal. In yet another embodiment, these matrices are operable upon digital time-samples. Accordingly, the composite video signal may be a digital signal or, alternatively, an analog-to-digital (A/D) converter may be interposed between input terminal 11 and sampling circuit 12.

Figure 11:
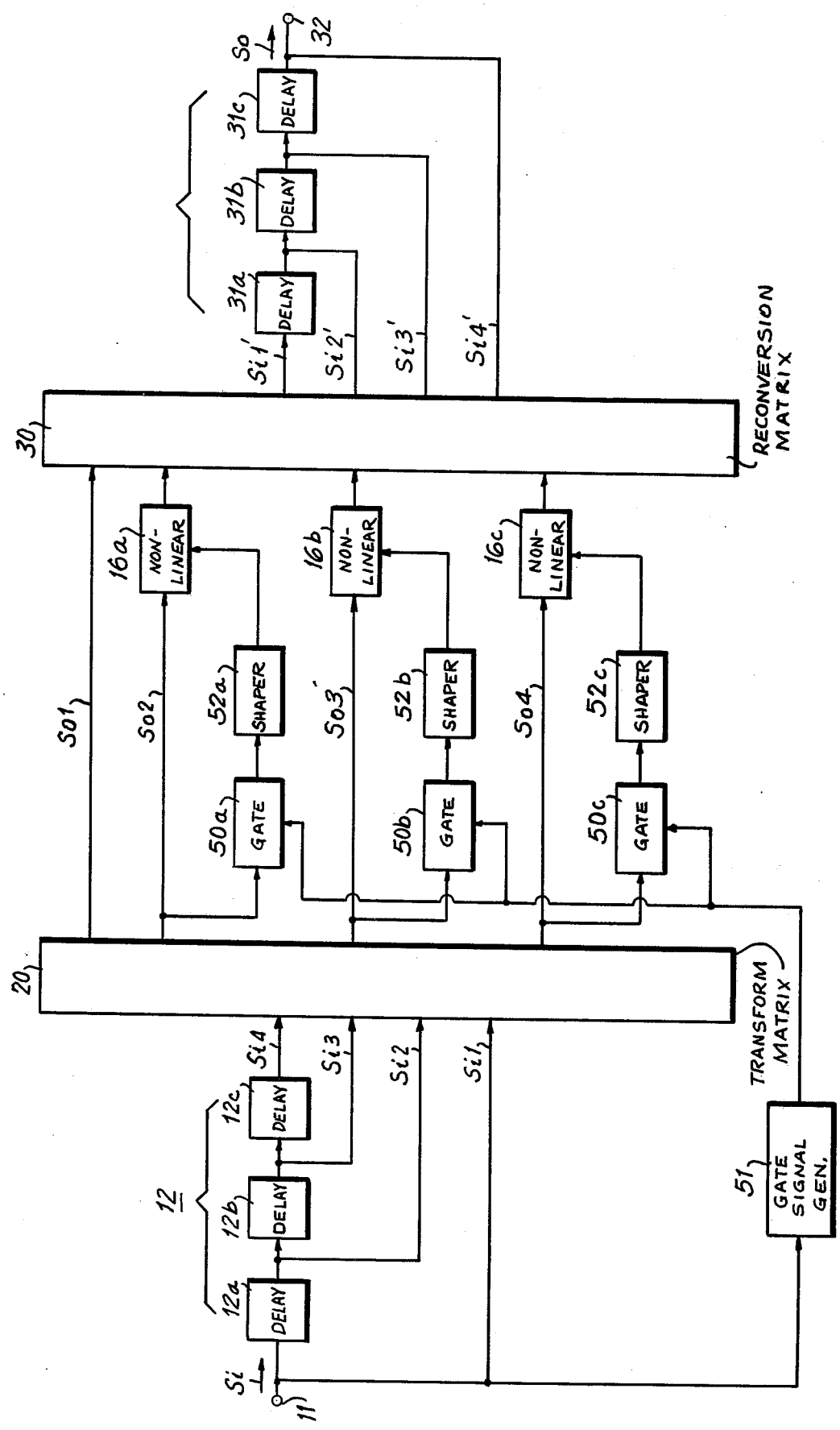
FIG. 11 is a block diagram of yet another embodiment of the present invention.

In the embodiments of nonlinear circuit 16, such as the embodiments shown in FIGS. 5 and 7, the threshold level to which each of the transformed signal components is compared is fixed. That is, the added bias levels produced by bias circuits 22A and 22B (FIG. 5), and the reference threshold level applied to terminal 27a (FIG. 7) are predetermined. In a still further embodiment, these bias levels and threshold levels can be variable. As such, the range $\Delta W$ of non-responsiveness (FIGS. 2 and 6) can be adjusted as a function of the amount of noise contained in the video signal. An embodiment of a noise reduction system using such a variable threshold signal suppressing circuit is shown in FIG. 11. In this illustration, like component parts are identified with the same reference numerals as used in FIG. 3. If it is assumed that the noise components are distributed uniformly, then such noise will be present during the vertical retrace period and, more particularly, will appear on the black level during this period where there is no video signal information. The embodiment of FIG. 11 proceeds upon detecting this noise level during the vertical retrace period.

Accordingly, nonlinear circuit 16a is provided additionally with a gate circuit 50a adapted to be supplied with the transformed signal component $S_{o2}$, the output of this gate circuit being applied through a signal shaper 52a as the threshold level for nonlinear circuit 16a. Similarly, nonlinear circuit 16b is provided additionally with a gate circuit 50b and a signal shaping circuit 52b, the gate circuit being supplied with transformed signal component $S_{o3}$. Also, nonlinear circuit 16c is provided additionally with a gate circuit 50c and a signal shaping circuit 52c, this gate circuit being supplied with transformed signal component $S_{o4}$. A gating signal is adapted to be supplied in common to each of gating circuits 50a, 50b and 50c. This gating signal is produced by a gating signal generator 51 which is coupled to input terminal 11 and is supplied with the composite video signal $S_i$.

Each of signal shaping circuits 52a, 52b and 52c is comprised of a rectifying circuit connected in series with a lowpass filter. Hence, each of these signal shaping circuits supplies a DC control signal to its associated nonlinear circuit, corresponding to the variable threshold level.

In operation, gating signal generator 51 detects the presence of the vertical retrace period in video signal $S_i$. During this vertical retrace period, each of gating circuits 50a, 50b and 50c is conditioned to transmit the respective transformed signal components $S_{o2}$, $S_{o3}$ and $S_{o4}$, respectively, to signal shaping circuits 52a, 52b and 52c. During the interval that the gating circuits are conditioned, the black level is supplied to each of the signal shaping circuits. Noise components which are present on this black level are rectified and filtered by signal shaping circuits 52a, 52b and 52c, and supplied as the threshold level to nonlinear circuits 16a, 16b and 16c, respectively. The threshold levels are maintained until the next vertical retrace period. Hence, depending upon the amount of noise which is detected during the vertical retrace period, the bias signal levels (FIG. 5) or reference threshold level (FIG. 7) are determined accordingly. For example, if the detected noise level is relatively large, then the range ΔW of non-responsiveness of the nonlinear circuit is increased. Conversely, if the detected noise level is relatively low, this range ΔW is decreased. In this fashion, noise components are more effectively suppressed.

While the present invention has been particularly shown and described with reference to certain preferred embodiments, it is readily appreciated that various changes and modifications in form and details can be made without departing from the spirit and scope of the invention. For example, input signal $S_i$ need not be limited solely to a composite video signal. Also, other orthogonal transform matrices can be used, together with a compatible reconversion matrix. Therefore, it is intended that the appended claims be interpreted as including these as well as all other such changes and modifications.

What is claimed is:

1. A method of reducing the noise of an input signal having components present in a give frequency spectrum, comprising the steps of deriving an orthogonal transform of said input signal, said orthogonal transform having n transformed signal components representing different respective portions of the frequency spectrum of said input signal; suppressing those transformed signal components, other than the transformed signal component representing the lower portion of said frequency spectrum, whose signal levels are less than a threshold level; and reconverting said n transformed signal components, less said suppressed components, substantially into said input signal.

2. The method of claim 1 wherein said step of deriving a orthogonal transform comprises time-sampling said input signal; multiplying selected ones of the time-samples of said input signal by predetermined multipliers; and combining selected groups of the multiplied time-samples to form said n transformed signal components.

3. The method of claim 2 wherein said step of reconverting comprises multiplying selected ones of the transformed signal components by predetermined multipliers; combining selected groups of the multiplied components to form n reconverted components; and combining said n reconverted components into an output signal that is substantially the same as said input signal less said suppressed portions.

4. The method of claim 1 wherein said orthogonal transform is the Hadamard transform; and said step of reconverting said n transformed signal components comprises deriving an inverse Hadamard transform of said n transformed signal components.

5. The method of claim 4 wherein said step of deriving the Hadamard transform of said input signal comprises time-sampling said input signal to produce at a given instant of time n discrete time-samples thereof; and deriving the Hadamard transform of said n discrete time samples.

6. A method of reducing the noise of an input signal, comprising the steps of time-sampling said input signal to produce at a given instant of time n discrete time-samples thereof; deriving the Hadamard transform of said n discrete time-samples by multiplying each of said time-samples by a respective set of n multipliers to form n groups of multiplied time-samples, each group being formed of n time-samples each multiplied by a respective one of its n multipliers, and adding the n multiplied time-samples in each group to form n transformed signal components; suppressing at least some of said n transformed signal components if their respective signal levels are less than a threshold level; and reconverting said n transformed signal components substantially into said input signal, less said suppressed components, by deriving an inverse Hadamard transform of said n transformed signal components.

7. The method of claim 6 wherein said step of deriving an inverse Hadamard transform comprises multiplying each of said n transformed signal components by a respective set of n multipliers to form n groups of multiplied transformed signal components, each group being formed of n transformed signal components each multiplied by a respective one of its n multipliers; and adding the n multiplied transformed signal components in each group to form n reconverted components.

8. The method of claim 7 further comprising combining said n reconverted components in a successive time sequence thereof such that successive ones of said n reconverted components are provided in successive time intervals.

9. The method of claim 7 wherein the sets of multipliers used to derive the Hadamard transform are equal to the sets of multipliers used to derive the inverse Hadamard transform.

10. Apparatus for reducing noise in a composite video signal, comprising means for receiving said composite video signal; orthogonal transform matrix means coupled to said receiving means for deriving the orthogonal transform of said video signal having n transformed signal components representing different respective portions of the frequency spectrum of said video signal; suppressing means for receiving the transformed signal components which represent the higher frequency portion of said spectrum, but not the lower frequency portion of said spectrum, to suppress those transformed signal components whose signal levels are less than a threshold level; and reconversion matrix means for receiving said n transformed signal components, including those which have passed through said suppressing means to reconvert said transformed signal components, less said suppressed components, into substantially said received video signal less the suppressed noise components.

11. The apparatus of claim 10 wherein said receiving means comprises sampling means for generating successive time-samples of said composite video signal.

12. The apparatus of claim 11 wherein said orthogonal transform matrix means comprises an n×n matrix for receiving n time-samples of said composite video signal, said n time-samples being applied concurrently to said n×n matrix, to multiply each of said time-samples by a respective set of multipliers; and for combining selected ones of the multiplied time-samples to form said n transformed signal components.

13. The apparatus of claim 12 wherein said sampling means includes delay means for imparting different delays to n successive time-samples so that all of said n time-samples are applied concurrently to said n×n matrix.

14. The apparatus of claim 13 wherein said n×n matrix is an Hadamard transform matrix.

15. The apparatus of claim 14 wherein said Hadamard transform matrix is comprised of n rows of n attenuator means in each row, each row of attenuator means being divided into n columns; an input terminal for each row; a phase inverter provided in at least some of said rows coupled to an associated input terminal; means for applying said n time-samples to corresponding ones of said input terminals; selected ones of said attenuator means in said rows being connected directly to said input terminal for the associated row and others of said attenuator means in said rows being coupled to the phase inverter in said associated row; n output terminals associated with said n columns, respectively; and adding means coupled to the respective output terminals for adding the outputs of respective attenuators in each column.

16. The apparatus of claim 12 wherein said suppressing means comprises a plurality of circuit means for receiving respective ones of said n transformed signal components from said n×n matrix, each of said circuit means producing an output signal directly proportional to that portion of the received transformed signal component that exceeds said threshold level.

17. The apparatus of claim 12 wherein said reconversion matrix means comprises an n×n matrix substantially the same as the n×n matrix comprising said orthogonal transform matrix means.

18. The apparatus of claim 17 wherein the n×n matrix comprising said reconversion matrix means receives said n transformed signal components and produces n reconverted components in response thereto; and said reconversion matrix means further comprises delay means for imparting different delays to said n reconverted components so that said n reconverted components are time displaced to form a sequence of reconverted components, and means for combining said sequence to reform said composite video signal.

19. The apparatus of claim 18 wherein said delay means comprises (n−1) delay circuits connected in cascade, the first of said reconverted components being supplied to the first of said delay circuits, and the output of each delay circuit being combined with the next succeeding one of said reconverted components.

20. Apparatus for reducing noise in a composite video signal, comprising means for receiving and sampling said composite video signal to generate successive time-samples thereof; orthogonal transform matrix means coupled to said receiving means for deriving the orthogonal transform of said video signal having n transformed signal components representing different respective portions of the frequency spectrum of said video signal, said orthogonal transform matrix means comprising an n×n matrix for receiving n time-samples of said composite video signal, said n time-samples being applied concurrently to said n×n matrix, to multiply each of said time-samples by a respective set of multipliers, and for combining selected ones of the multiplied time-samples to form said n transformed signal components; suppressing means for receiving the transformed signal components which represent the higher frequency portion of said spectrum to suppress those transformed signal components whose signal levels are less than a threshold level, said suppressing means comprising a plurality of circuit means for receiving respective ones of said n transformed signal components from said n×n matrix, each of said circuit means producing an output signal directly proportional to that portion of the received transformed signal component that exceeds said threshold level, and each of said circuit means comprising a pair of threshold bias means for providing the received transformed signal component with positive and negative bias levels, respectively, a pair of rectifiers of opposite polarity to rectify those portions of the transformed signal component that exceed said respective positive and negative bias levels, and summing means for summing the rectified components; and reconversion matrix means for receiving said n transformed signal components, including those which have passed through said suppressing means to reconvert said transformed signal components, less said suppressed components, into substantially said received video signal less the suppressed noise components.

21. Apparatus for reducing noise in a composite video signal, comprising means for receiving said composite video signal, including sampling means for generating successive time-samples of said composite video signal; orthogonal transform matrix means for deriving the orthogonal transform of said time-samples having n transformed signal components, said orthogonal transform matrix means including an n×n matrix for receiving n time-samples of said composite video signal, said n time-samples being applied concurrently to said n×n matrix, to multiply each of said time-samples by a respective set of multipliers, and said n×n matrix combining selected ones of the multiplied time-samples to form said n transformed signal components; suppressing means to suppress those transformed signal components whose signal levels are less than a threshold level, and including a plurality of circuit means for receiving respective ones of said n transformed signal components from said n×n matrix, each of said circuit means producing an output signal directly proportional to that portion of the received transformed signal component that exceeds said threshold level and each of said circuit means comprising comparator means for comparing the level of the received transformed signal component with a threshold level, and attenuating means selectively operable when the level of said received transformed signal component is less than said threshold level for attenuating said received transformed signal component substantially to a zero level; and reconversion matrix means for receiving said n transformed signal components, including those attenuated signal components, to reconvert said transformed signal components into substantially said received video signal less the suppressed noise components.

22. The apparatus of claim 21 wherein each of said circuit means further includes a full-wave rectifier responsive to said received transformed signal component for supplying said comparator means with a rectified signal.

23. Apparatus for reducing noise in a composite video signal, comprising means for receiving and sampling said composite video signal to generate successive time-samples thereof; orthogonal transform matrix means coupled to said receiving means for deriving the orthogonal transform of said video signal having n transformed signal components representing different respective portions of the frequency spectrum of said video signal; said orthogonal transform matrix means comprising an $n \times n$ matrix for receiving n time-samples of said composite video signal, said n time-samples being applied concurrently to said $n \times n$ matrix, to multiply each of said time-samples by a respective set of multipliers, and for combining selected ones of the multiplied time-samples to form said n transformed signal components; suppressing means for receiving the transformed signal components which represent the higher frequency portion of said spectrum to suppress those transformed signal components whose signal levels are less than a threshold level, said suppressing means comprising a plurality of circuit means for receiving respective ones of said n transformed signal components from said $n \times n$ matrix, each of said circuit means producing an output signal directly proportional to that portion of the received transformed signal component that exceeds said threshold level, and each of said circuit means including detecting means for detecting the noise level present in said received transformed signal component at predetermined intervals of said video signal, and means for establishing said threshold level as a function of said detected noise level; and reconversion matrix means for receiving said n transformed signal components, including those which have passed through said suppressing means to reconvert said transformed signal components, less said suppressed components, into substantially said received video signal less the suppressed noise components.

24. Apparatus for reducing noise in a composite video signal, comprising means for receiving said composite video signal, including sampling means for sampling a line of the received video signal and for sampling a delayed line of the video signal, said sampling means comprising line delay means having a time delay equal to the horizontal line interval of said received video signal for producing a horizontal line delayed version of said composite video signal, and plural delay means connected to receive said composite video signal and said line delayed version of said composite video signal, respectively, for imparting respective delays less than said horizontal line interval to the received composite video signal and the horizontal line delayed version thereof to produce n concurrent time-samples of said composite vide signal; orthogonal transform matrix means for receiving said n concurrent time-samples to derive the orthogonal transform of said time-samples, said orthogonal transform having n transformed signal components and said orthogonal transform matrix means comprising an $n \times n$ matrix for receiving said n concurrent time-samples to multiply each time-sample by a respective set of multipliers and to combine selected ones of the multiplied time-samples to form said n transformed signal components; suppressing means for receiving at least some of said n transformed signal components to suppress those transformed signal components whose signal levels are less than a threshold level; and reconversion matrix means for receiving said n transformed signal components, including those which have passed through said suppressing means to reconvert said transformed signal components into substantially said received video signal less the suppressed noise components.

* * * * *